US007058892B1

(12) United States Patent
MacNaughton et al.

(10) Patent No.: US 7,058,892 B1
(45) Date of Patent: *Jun. 6, 2006

(54) DISPLAYING CONTENT FROM MULTIPLE SERVERS

(75) Inventors: Bruce A. MacNaughton, Columbus, OH (US); Leigh R. Turner, Upper Arlington, OH (US)

(73) Assignee: America Online, Inc., Dulles, VA (US)

( * ) Notice: Subject to any disclaimer, the term of this patent is extended or adjusted under 35 U.S.C. 154(b) by 474 days.

This patent is subject to a terminal disclaimer.

(21) Appl. No.: 10/079,228

(22) Filed: Feb. 20, 2002

Related U.S. Application Data

(63) Continuation of application No. 09/455,652, filed on Dec. 7, 1999, now Pat. No. 6,433,795, which is a continuation of application No. 09/135,694, filed on Aug. 18, 1998, now Pat. No. 6,020,884, which is a continuation of application No. 08/745,294, filed on Nov. 8, 1996, now Pat. No. 5,796,393.

(51) Int. Cl.
*G06F 3/14* (2006.01)
*G06F 15/16* (2006.01)

(52) U.S. Cl. ............... 715/738; 715/751; 715/512; 715/779; 709/219

(58) Field of Classification Search ........... 345/738, 345/751, 733, 758, 753, 741, 742, 760, 971, 345/804, 779, 745, 744; 709/201, 203, 217–219, 709/249; 719/329, 315, 313, 310; 715/501.1, 715/512, 513

See application file for complete search history.

(56) References Cited

U.S. PATENT DOCUMENTS

| 5,008,853 A | 4/1991 | Bly et al. ................. 345/331 |
| 5,021,949 A | 6/1991 | Morten et al. ......... 395/200.61 |
| 5,329,619 A | 7/1994 | Page et al. ............. 395/200.33 |
| 5,440,551 A | 8/1995 | Suzuki ........................ 370/60 |
| 5,448,566 A | 9/1995 | Richter et al. ............. 370/94.1 |
| 5,448,567 A | 9/1995 | Dighe et al. ............... 370/94.2 |
| 5,491,800 A | 2/1996 | Goldsmith et al. ..... 395/200.51 |
| 5,497,463 A | 3/1996 | Stein et al. ............ 395/200.33 |
| 5,499,343 A | 3/1996 | Pettus .................... 395/200.33 |

(Continued)

FOREIGN PATENT DOCUMENTS

WO  WO 97/34244  9/1997

(Continued)

OTHER PUBLICATIONS

Brown, et al., *WWW Plug-Ins Companion*, Que Corporation, pp. 351-362, Oct. 1996.

(Continued)

*Primary Examiner*—Raymond J. Bayerl
(74) *Attorney, Agent, or Firm*—Fish & Richardson P.C.

(57) ABSTRACT

A request is sent for a web page and the web page is received from a first server. The web page is displayed by a browser. An identification of the web page is sent to a second server. Content is received from the second server. The content is selected by the second server based on the identification sent to the second server. A toolbar that includes a button is displayed, and the received content is displayed in response to a user selecting the button.

43 Claims, 7 Drawing Sheets

U.S. PATENT DOCUMENTS

| | | | | |
|---|---|---|---|---|
| 5,559,949 | A | | 9/1996 | Reimer et al. .......... 707/501 X |
| 5,615,336 | A | | 3/1997 | Robson et al. .............. 395/683 |
| 5,710,884 | A | | 1/1998 | Dedrick ................ 395/200.47 |
| 5,760,771 | A | | 6/1998 | Blonder et al. ......... 345/329 X |
| 5,764,916 | A | | 6/1998 | Busey et al. ............ 345/331 X |
| 5,799,157 | A | | 8/1998 | Escallon ..................... 395/227 |
| 5,826,025 | A | * | 10/1998 | Gramlich .................... 709/217 |
| 5,845,073 | A | | 12/1998 | Carlin et al. ................ 709/217 |
| 5,878,219 | A | | 3/1999 | Vance, Jr. et al. .......... 709/217 |
| 5,944,791 | A | | 8/1999 | Scherpbier ................. 709/218 |
| 5,974,446 | A | * | 10/1999 | Sonnenreich et al. ... 709/203 X |
| 6,026,429 | A | | 2/2000 | Jones et al. ................. 709/201 |
| 6,081,829 | A | | 6/2000 | Sidana ....................... 709/203 |

FOREIGN PATENT DOCUMENTS

| | | |
|---|---|---|
| WO | WO 97/37303 | 10/1997 |

OTHER PUBLICATIONS

"Prodigy launches 100 Interest Groups on the World Wide Web; All Sited have deep links to Chat and Newgroups". *Business Wire*, Sep. 27, 1995.

"AOL's Grand Goal; American Online seeks to transform itself into a Major Internet player," *Information Week*, Jul. 31, 1995, p. 108.

"America Online Growing Pains," *Newbytes*, Mar. 7, 1995.

Office Action dated Apr. 21, 2005 from European Application No. 97 946 924.4- 1238.

Walther, M., "Supporting Development of Synchronous Collaboration Tools on the Wed with GroCO" XP-002160544, Proceedings of the ERCIM workshop on CSCW and the Web, Sankt Augustin, Germany, pp. 1-6, Feb. 7-9, 1996.

* cited by examiner

DISPLAYING CONTENT FROM MULTIPLE SERVERS

This application is a continuation of U.S. patent application Ser. No. 09/455,652 filed Dec. 7, 1999, now U.S. Pat. No. 6,433,795 issued Aug. 13, 2002, which was a continuation of U.S. patent application Ser. No. 09/135,694 filed Aug. 18, 1998, now U.S. Pat. No. 6,020,884 issued Feb. 1, 2000, which was a continuation of U.S. patent application Ser. No. 08/745,294 filed Nov. 8, 1996, now U.S. Pat. No. 5,796,393 issued Aug. 18, 1998.

BACKGROUND OF THE INVENTION

1. Field of the Invention

The present invention relates generally to systems for human-computer interaction. In particular, the present invention relates to a system and method for enhancing a computer user's Internet browsing experience by determining a user's preferences and facilitating the user's interaction with a community of users (community members) sharing similar preferences via community content annotations related to on-line content and via synchronous and asynchronous interactions with community members sharing similar preferences.

2. Description of Related Art

Computer information services today offer a variety of services and content to their subscribers. For example, subscribers of the CompuServe® Information Service may retrieve information or content from a repository maintained by the service or possibly, by a third party provider. In addition, CompuServe subscribers may communicate with other subscribers. Communications may occur in real time as subscribers initiate and join ongoing conference room or "chat" sessions managed by the information service. CompuServe subscribers may also communicate directly with one another as well as with non-members via electronic mail (e-mail.) Special interest on-line discussion groups (i.e., message boards or forums) within CompuServe also provide opportunities for subscribers to communicate with one another. Forums are generally comprised of three major areas: a message area, a library, and a conference room for forum conferencing.

The message area serves as a place for posting and responding to messages relating to a specific topic. When a message is posted and someone responds to it, a thread is created. A thread is a string of two or more messages that are related to one another and that share a particular subject or topic heading (i.e., thread). The forum library serves as a storage area for documents, graphics, and other information that may be browsed, searched, or downloaded. Forum conferences, on the other hand, are live electronic conversations between two or more forum members. It is the facilitation of interaction via these various methods and in relation to shared areas or topics of interest that gives on-line information service subscribers a sense of belonging to a community.

To interact with the CompuServe Information Service, a subscriber's computer may be equipped with communication or connection software that has a graphical user interface such as the CompuServe Information Manager for Windows® (WinCIM). The communication software allows the subscriber to establish and maintain a connection with the information service and to perform tasks and retrieve information content from the service as well as interact with other subscribers. Typically, the communication software is designed to support all of the features and functionality of the information service and is tailored to a user's interaction with the on-line service. Content at the on-line service is typically organized or categorized according to areas of interest among groups of users (e.g., Windows Users'Forum, CNN Online, Entrepreneur's Small Business Forum). Content is generally presented or displayed in a similar manner regardless of the area of interest. Users are able to locate content easily and communicate easily with others who share similar interests (e.g., via forums, e-mail, conferencing or chat) thereby creating communities.

The Internet and World Wide Web (Web), comprised of a vast array of international computer networks, provide on-line service subscribers with additional content or resources to search. These international computer networks may be comprised of foreign host computers or servers (i.e., not part of the on-line service network) that users access to locate resources. Typically, these resources are accessed using a Web browser, such as Spry's Mosaic, Microsoft's Internet Explorer, or Netscape's Navigator, capable of understanding the HyperText Markup Language (HTML) used to create the documents (Web pages) found on the Web and the Hyper-Text Transfer Protocol (HTTP) (as well as other protocols and/or applications such as File Transfer Protocol (FTP), Internet Relay Chat (IRC), telnet, etc., collectively "Internet protocols") used to navigate or locate sites on the Web from which the HTML and other documents may be accessed. Although Web browsers typically have varying levels of functionality or sophistication, retrieved content is displayed according to views or presentations specific to the Web page currently presented by the Web browser. Each screenful of information includes menu choices, highlighted words, or graphics through which users may locate further information, either from the same computer or by linking automatically to another computer somewhere else on the Internet. Typically, the views and presentations of the Web pages are different than those provided by the communication software from the on-line service because the Web browser is, in fact, a separate client application displaying Web pages containing presentation directives in the form of HTML or another protocol/application such as FTP, IRC, etc.

Web sites are typically linked to one another via Uniform Resource Locators (URLs). Users may navigate or browse within a site or between sites simply by selecting or clicking on menu choices, highlighted words, or graphics (i.e., links on Web pages) that represent URLs. Despite the fact that navigating the Web is easy (users simply point and click), as it exists today, the Web is a huge, daunting, mostly disorganized space in which people wander aimlessly from link to link (i.e., URL) in hopes of finding meaningful content. Browsing the Web is essentially a solitary experience. Most Web pages are designed to present information to users rather than to promote interactions with other humans. Most interaction with other humans consists of, "check out this URL" by word of mouth, an e-mail message, or some other printed medium. Few, if any opportunities for interacting with others are presented to Web users.

What is further confusing to many computer users is the fact that they must learn and use different user interface software for interacting with or navigating/browsing the information service (i.e., information service communication software) than they use for interacting with or navigating/browsing the Web. Users' on-line experiences are compromised because they must switch between applications to access information service content and then Internet/Web content. Switching between applications requires users to change not only the method of interaction, but also changes the context of interactions from community-oriented on the on-line service to solitary, less socially oriented interactions on the Internet/Web. Therefore, there is a need for an integrated method of interaction that allows computer users to access the Internet/Web using a commercially available browser, but also enjoy community-oriented activities and interactions of an on-line service that typically may be accomplished only by leaving the Internet/browser and switching to the on-line service content/on-line service communication software. Web users need the ability to form on-line relationships with others and to communicate with others of similar interests or background.

SUMMARY OF THE INVENTION

The present invention—the Community Browser—enhances a user's on-line experience by enabling those with similar interests or shared circumstances to enjoy on-going social relations. Social relations in an on-line environment translate to both real-time interactive methods or options, such as chat and gaming, and static interaction methods, such as viewing annotations (e.g., threaded messaging) and shared bookmarks. The enabling technology of the Community Browser augments the available content on the Internet/Web that is accessed via a browser with interaction opportunities for on-line service members and for Community-created content by on-line service members. The on-line community environment is integrated with a user's browser so that messaging and interaction components of the on-line service are available while the user browses the Internet.

The Community Browser is a set of tools and capabilities that enable Web users to benefit from a focused view of the Web based on shared interest, an available group of people accessible for interactions, and a repository for relevant and pertinent information discovered while browsing or navigating the Web. The tools may be segmented into two groups: core components and interaction components. The core components enable a community to exist and are generally transparent to the user. Interaction components enable various capabilities and user interactions and facilitate the creation of community content by users.

The core components comprise a Community Server and a Community Client. The Community Server maintains communications with the Community Client which operates on the user's computer. Together the Community Server and Community Client notify the user of annotations by community members affiliated with whatever Web page (as identified by a particular URL) he or she happens upon. The Community Server serves requests from the Community Client by initiating sessions between the appropriate annotation components and the Community Client, thus enabling annotations to be created and interactions with community members to occur in conjunction with navigating the Web. The primary function of the Community Server is as a community communication hub for facilitating interaction with a community while the user's browser is running.

The Community Client serves primarily as an access mechanism to the community services, annotations, and interactions. In a preferred embodiment of the present invention, it is manifested as a toolbar on the user's computer screen when used in conjunction with a Web browser selected by the user. In another embodiment of the present invention, it may also be used independently of a Web browser. Toolbar options facilitate the user's community interaction options by, for example, allowing the user to access a Web page for the community or initiate a chat session with another community member.

The interaction components or methods (i.e., community interaction options) enable aspects of community experiences for users and allows them to engage in on-going social relations. The interaction components may comprise message boards (or forums), chat, community bookmarks, gaming, and voting. In a preferred embodiment of the present invention, the interaction components support "capabilities" associated with a community. Capabilities may be viewed as actions that may be performed in a community. Each community may support a set of common or unique capabilities.

Message boards enable asynchronous interactions between community members through threaded messaging. Community threaded messages or annotations are associated with a particular Web page as identified by a URL. The concept of associating annotations to Web pages enables community members to create a natural organization for their messages. The Web page acts as the high-level interest filter and the topics of the associated annotations further define the context based on contributions from community members. Thus, community messaging becomes a true expression mechanism for the community and the millions of Web pages become catalysts for eliciting comments from community members.

Conferencing or "chat" enables real-time interactions between community members. Community members may initiate or just participate in real-time streaming chat sessions. Streaming chat includes the capability for users to exchange text, audio, and other multimedia type data.

Community bookmarks enable community members to contribute Web pages for the benefit of other community members. Contributors gain community recognition for their contributions. When creating a community bookmark, the contributor provides a title and a description for his or her contribution. This information may be indexed into a directory service at the time of creation so that it may be retrieved later.

Community members may also participate in on-line games such as DOOM, Quake, Flight Simulator. Users are presented with capabilities for inviting others to participate in a game and capabilities for actually participating in an on-line game.

Voting enables community managers and members to understand the temperament of the community based on input gathered through voting. There are two types of voting. (1) Votes may be registered for or against community bookmarks, thus creating a community rating system for the bookmarks. (2) A real-time polling mechanism enables community managers to ask questions and get immediate feedback from the community members while on-line.

The present invention allows Web users to form on-line relationships with Community members, to communicate with others of similar interest or backgrounds, and to view Community content. The Communities of the present invention may serve as a starting or focal point for Web navigating. The present invention provides a structure for a Web experience and helps users avoid being overwhelmed or overloaded by the complexity of the Web. The features and benefits of the present invention may be better understood by referring to the following description in conjunction with the accompanying drawings.

BRIEF DESCRIPTION OF THE DRAWING(S)

DETAILED DESCRIPTION OF THE PREFERRED EMBODIMENT(S)

Figure 1A:
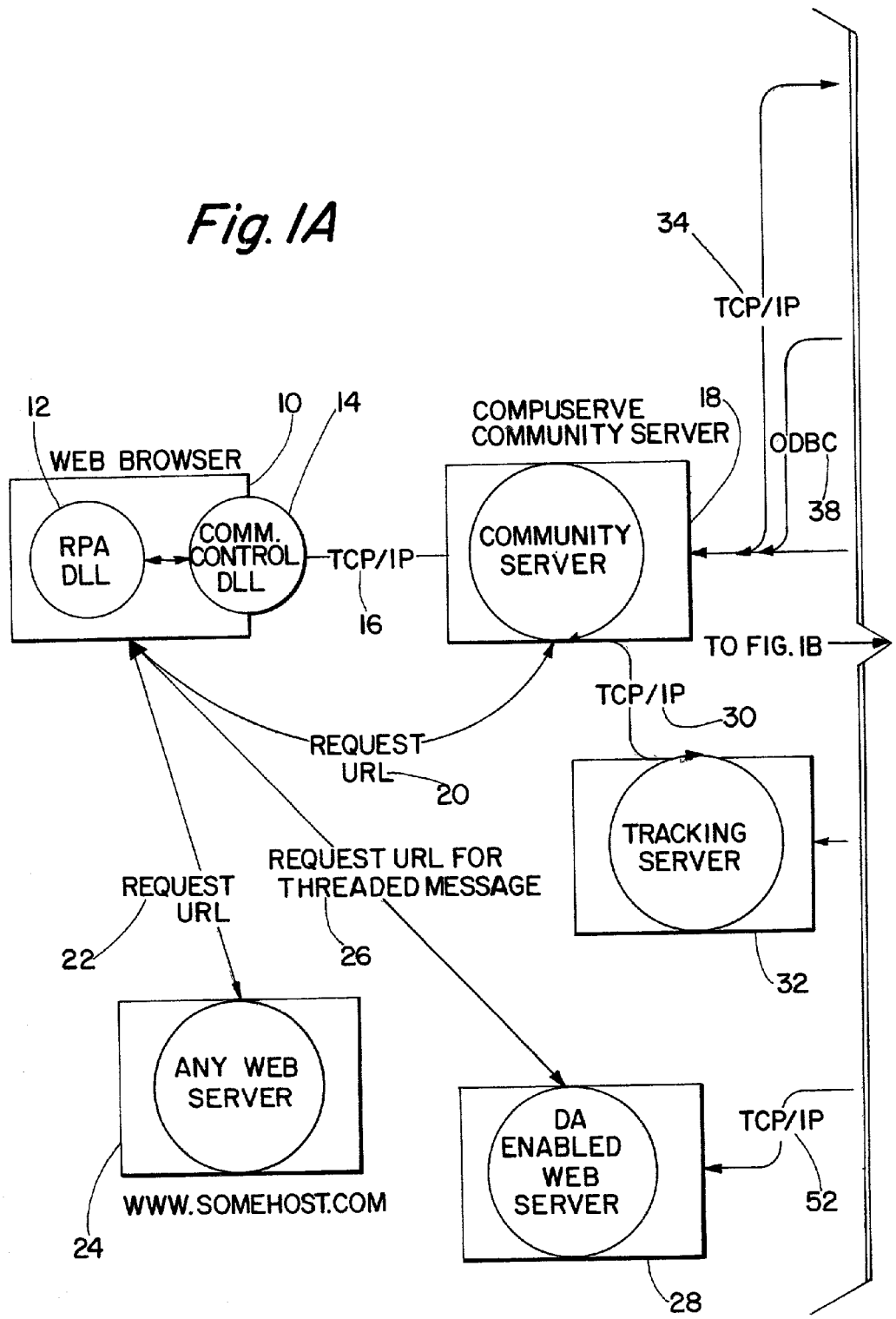
FIG. 1A and FIG. 1B is a diagrammatic representation of a system architecture for a preferred embodiment of the present invention.
Figure 1B:
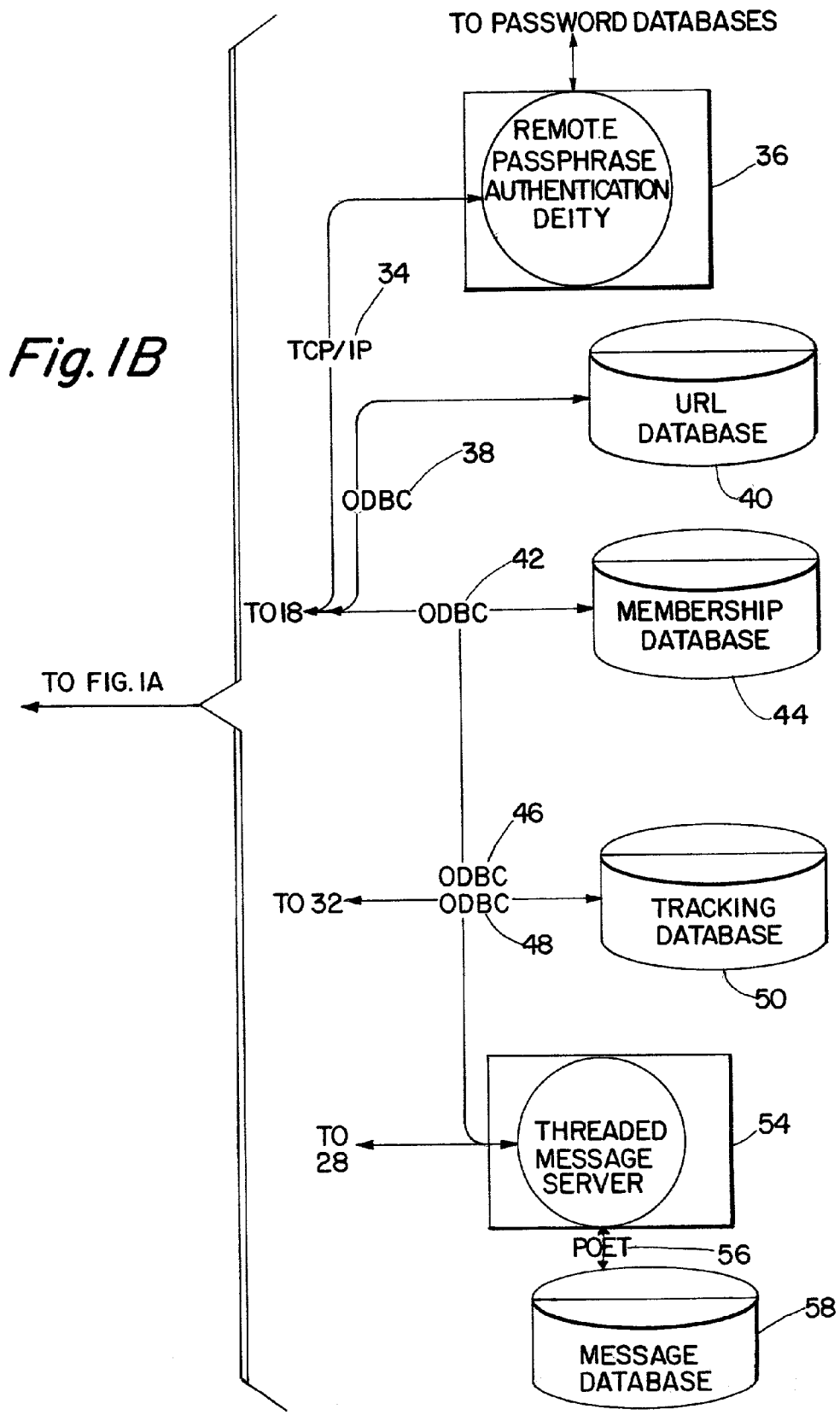

Referring to FIGS. 1A and 1B, a diagrammatic representation of the system architecture for a preferred embodiment of the present invention is shown. Preferably, the system is comprised of several servers providing specialized services to accomplish the features and functionality of the present invention. Some servers may be part of a wide area network owned, operated, and maintained by an on-line service. Other servers may be owned, operated, and maintained by a third party or many third parties and may thus constitute a foreign service. From the viewpoint of the on-line service, these third-party servers are foreign servers because they are not part of the wide area network of the on-line service. Preferably, the foreign servers are part of a global, wide area network such as the Web portion of the Internet. Each server, whether part of the on-line service or foreign, is comprised of hardware and software elements that provide a sophisticated set of services or operations for use by clients. Preferably, communications between servers are accomplished using well-known connection technology such as TCP/IP connections. Finally, data needed by the present invention may be stored in databases accessible via any one of a number of interfaces (e.g., Open Database Connectivity (ODBC) interface.)

In a preferred embodiment of the present invention, object-oriented software technology (Object-Oriented Programming—OOP) is used to implement the features and functionality of the software components that comprise the present invention. OOP techniques involve the definition, creation, use, and destruction of "objects." These objects are based on software entities or classes comprising data types and procedures that are automatically associated with them. Classes serve as templates that instruct on building or creating an object. OOP techniques are well-known in the art.

Referring again to FIGS. 1A and 1B, users of the present invention interact with or browse the Web using a commercially available Web browser 10 such as Spry's Mosaic, Netscape's Navigator, or Microsoft's Internet Explorer. The Web browser allows a user to retrieve information from servers through any one of a number of well-known protocols and/or applications (including the HyperText Transfer Protocol (HTTP), File Transfer Protocol (FTP), Internet Relay Chat (IRC), telnet) that has been made publicly available on the Internet. A user retrieves information via the browser by supplying a URL 22. A connection is then made to the Web server 24 associated with the URL. Once connected, the user may "browse" the information at the Web site by reading the text and viewing the graphics on the Web page and selecting links to related information which may or may not be available from the same server. The servers with which the user interacts are owned, operated, and maintained by many different parties and are, from the viewpoint of an on-line service, foreign servers.

Also in communication with the user's Web browser 10—via a Community Client comprising a Remote Passphrase Authentication module 12 and community control module 14 embodied in dynamic link libraries (DLLs)—is a Community Server 18 which is part of the on-line service (i.e., owned, operated, and maintained by the service). The Community Server 18 manages communities as defined by Home Pages for each community, annotations (i.e., information service content) and their associations with or links to Web pages (as identified by URLs), and sessions established on behalf of members to enable community interactions via community interaction options. The Community Server 18 acts as the community communication hub. Preferably, the on-line service community environment is based on the same technology as the Web so that communities integrate easily with the Web environment. Communications between the community control module 14 of the Community Client and Community Server 18 may occur via a TCP/IP connection 16. When the user navigates to a new Web page 22, a message (e.g., HTTP message containing the new URL 20) is sent from the Community Client 14 to the Community Server 18 via the TCP/IP connection 16 so interactions may begin with the community associated with the new Web page.

In a preferred embodiment of the present invention, user authentication is accomplished via a separate Remote Passphrase Authentication module 12 of the Community Client that communicates with a Remote Passphrase Authentication (RPA) enabled server 36 via the Community Server 18. The RPA enabled Server 36 may further access a passphrase database to perform user authentication. Communications between the Remote Passphrase Authentication module 12 of the Community Client, Community Server 18, and RPA enabled server 36 may be accomplished in accordance with any one of a number of well-known protocols and/or applications including HTTP, FTP, IRC, etc. messages sent via TCP/IP connections 16, 34.

Once a user is authenticated, a "persistent connection" is made between the Community Client module 14 and the Community Server 18. This persistent connection, unique to the present invention, is used to send and receive notifications to and from the Community Server 18. The Community Client 14 reports to the Community Server 18 changes in the Web page as identified by the URL 20. Preferably, changes are reported by the Community Client 14 to the Community Server 18 using HTTP messages 20. Other protocols such as FTP, IRC, etc. may be used as well. The Community Server 18 responds to the Community Client 14, via a HTTP message 20, with notifications. Consequently, the persistent connection between the Community Server 18 and Community Client 14 may be accomplished using extensions to a stateless connection technology (e.g., increasing a time-out value on a HTTP connection.) Additional transparent communication thus takes place between the Community Client 14 and Community Server 18 to track the user's Web interaction and determine a context for the user's interactions while the user interacts with the Web browser in accordance with a series of stateless transactions in which the user changes Web pages based on changes to the current URL 22. In addition to HTTP, other protocols such as FTP, IRC, etc. may be used depending on what is to be displayed or what interactions are to occur.

Each community supported by the present invention may provide "capabilities." The actions that may be performed within a community are the communities capabilities. Capabilities represent a variety of interaction methods or options. Primary or core capabilities may include a "Community Centre" (or Home Page which introduces the user to the community), "Create or View Comments" (e.g., annotations such as threaded messages, documents, spreadsheets, etc. for a particular community), "Who's Online" (a list of members currently in the community), "Chat" (real time interactions with other community members), "Invitations" (messages from one community member to another to chat, play a game, etc.), "Help" (instructions on how to perform a particular task, for example), "Notices and Personal Messages" (e.g., email), "Internet Features" (e.g., CUCME, Internet Phone), "Games" (e.g., DOOM, Quake, Flight Simulator). Special capabilities may also be developed for a community.

Users may be introduced to or notified of capabilities via "notifications." Notifications are associated with communities and indicate or reference additional information or content (i.e., Community Content) as well as interaction options or methods that may be of interest to the user. As the user continues to browse or "surf" the Web, notifications may be sent to the Community Client 14 from the Community Server 18 to let the user know what additional community capabilities or features are available for the current Web page or URL. For example, for a given URL, notifications may be sent to indicate a series of annotations exist for this page, additional community members are also at this page, and/or a real-time chat is in progress between several community members. Notifications may be viewed as temporary listings as they are determined at the time of access to the URL to reflect the current state of the community. Notifications may also be comprised of specific on-line content such as current stock quotes that the user has requested to receive at specified intervals (e.g., once a day.)

Annotations—which are one type of capability of the present invention—may be viewed as "notes" regarding related information service content that are associated with or linked to a particular Web page as identified by a URL. The notes may be comprised of a list of subject or topic related headings (i.e., forum message threads) that a user may peruse, a list of threaded messages relating to a particular subject or topic heading, or the contents of a particular message. Notes may also include library or archive files related to the general subject matter or topic of messages. When the user navigates to a Web page, as identified by a URL and for which annotations are available, a Web page containing the annotations is presented on request to the user to allow the user to review or access the annotations.

Referring again to FIGS. 1A and 1B, the Threaded Message Server 54 is used to create and retrieve threaded message type annotations that are associated with specific URLs. As community members interact with one another via message boards, the messages they submit are organized and stored by this component 54 for later retrieval based on a particular URL. When another user (or the same user) later provides the same URL, the annotations (or threaded messages) associated with the URL may be retrieved by the Threaded Message Server 54 and presented to the user. Depending on the actions of the user, a list of threaded messages, a list of messages within a thread, or an actual message may be presented to the user. Access to related library or archive files may also be provided.

In a preferred embodiment of the present invention, the Threaded Message Server 54 runs as an extension to a server that performs Remote Passphrase Authentication so that access to a community is through a secure means. The Community Server 18 interacts with the URL database 40 to determine whether annotations are available for a particular URL (i.e., the URL just selected by the user). If the URL database 40 indicates annotations are available, the Community Server 18 interacts with the Threaded Message database 58 (preferably, via a POET interface to the Threaded Message Server 54) to locate the messages. Preferably, the URL database is organized according to communities and contains maps (e.g., by referencing or pointing to a file) to on-line service content associated with a URL (or a series of URLs).

The Community Server 18 also interacts with a Membership database 44 to determine if a user belongs to the community associated with the URL. If it is determined a user belongs to a community, the user is given the opportunity to enter the community (e.g., select a control button or icon that represents the community). The user may then access a home page for the community, view community comments (e.g., view the annotations of the community associated with the URL), search community comments, and create or reply to community comments. A member of a community may also interact and communicate with other community members who have similar interests or shared circumstances by initiating synchronous communications such as chat or conferencing.

To become a member of a community, a user affirmatively requests access to a membership module which, in a preferred embodiment of the preset invention, is a stand-alone process that may be initiated from any one of a number of sources including a Web site, a Community Client, on-line service sign-up process, etc. During the membership process, information about the user (e.g., preferences and profile data such as name, address, age, billing information, interests and hobbies, favorite Web sites, etc.) is collected and stored in the Membership database 44. Because users complete the membership process for each community they wish to join, they may have a different profile for every community to which they belong. Users may also cancel community memberships resulting in deletion of the specific preference and profile data from the community membership database. In some cases, a user may become a member of a community automatically (i.e., without affirmatively initiating the membership process) as some communities may be open to all on-line service users or possibly, all Web users.

In a preferred embodiment of the present invention, the Community Server 18 communicates with a Tracking Server 32 via a TCP/IP connection 30 to determine the contents of notifications to be sent. Notifications include information regarding the presence of members within a community at a given time and information regarding chat sessions currently in progress. This dynamic information preferably, is, tracked so that notifications accurately reflecting the state of a community may be sent quickly to the user who has just entered the community by specifying an associated URL. The Tracking Server 32 thus logs in a tracking database 50 accessible via an OBDC interface 48 information regarding the activities of users served by the Community Server 18. Activities that may be tracked include Web pages accessed, messages posted to the message board, and chat rooms created or entered. The Tracking Server 32 monitors user actions so that users who share similar interests may learn of one another and communicate with one another through a variety of options (e.g., engaging in real-time chat sessions or viewing threaded messages submitted by community members). In addition, data about user actions may be aggregated and reported to community members (e.g., results of voting on a particular issue).

In a preferred embodiment of the present invention, a session between a Community Server and a Community Client is managed by primarily two objects—a Session object and a Community object. The Session object controls communications sessions with the Community Server. It maintains a list of communities to which the users belongs so that access to communities may be provided as the user navigates the Web. In the event the user requests access to community content or community interactions, the Session object establishes a Community object that manages interactions with a specific Community server. The Community server, in turn, is responsible for managing interactions with the community associated with the Web page. Preferably, each community is identified by a text name and an identification number and has an associated port number through which a connection may be established to a Community server. Preferably, each interaction between a Community Client and a Community Server is identified by a "Capability Id" number. These numbers represent specific features, functions, or community capabilities that may be offered to the user. Primary or core capabilities may include a "Community Centre" (or Home Page which introduces the user to the community), "Create or View Comments" (e.g., annotations for a particular community), "Who's Online" (a list of members currently in the community), "Chat" (real time interactions with other community members) and "Invitations" (messages from one community member to another to chat, play a game, etc.). Special capabilities may also be developed for a community.

Each capability may be comprised of one or more functions. For example, a "comments capability" that provides the ability to annotate or attach comments to a Web site may support functions such as notification (change attribute of screen to notify user comments for the current Web page are available), messaging (view list of topics associated with a Web page, view list of topics created in a community, read messages within a topic, reply to a message, etc.), and chat (view list of associated public chat rooms, enter into private and public chat sessions). A membership capability may include functions that support listing (list of members currently participating in a community), profile (access member profile data), modify (personal profile data), and search (community membership), etc.

Figure 2:
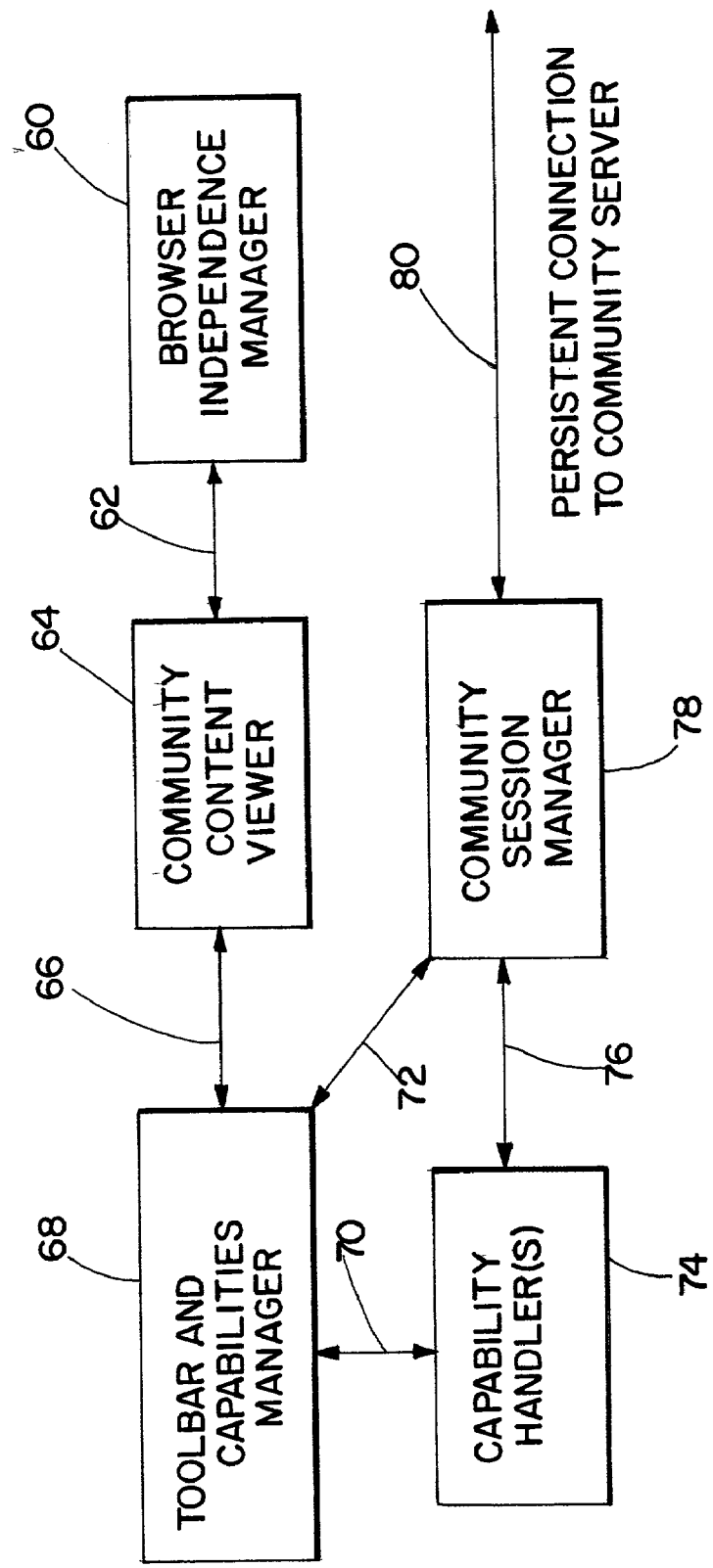
FIG. 2 is a diagrammatic representation of Community Client components for a preferred embodiment of the present invention.

Referring to FIG. 2, a diagrammatic representation of the Community Client components for a preferred embodiment of the present invention is shown. In one embodiment of the present invention, the Community Client is operative in the Microsoft® Windows® operating system environment. In a preferred embodiment of the present invention, a user of the present invention interacts with the Community Server via the Community Client. The Community Client, which may be resident on the user's computer and appear as a toolbar, is responsible for both the user's on-line experience and his or her connection with the Community Server. Preferably, this component does not rely on a propriety interface to the Web. Rather it operates as an extension to a commercially available browser such as Spry's Mosaic, NetScape's Navigator, or Microsoft's Internet Explorer. The Browser Independence Manager 60 abstracts the browser's programmable interface so that multiple browsers may be supported. The Community Session Manager 78 handles communication with the Community Server based on requests from the Web browser. Community content is retrieved and then passed to the Community Content Viewer 64. The Toolbar and Capabilities Manager 68 is responsible for creating and managing the Community "Toolbar" that appears on the user's screen. From the user's point of view, the toolbar is the user interface for controlling the Community. The Toolbar and Capabilities Manager 68 may also interface to one or more Capability Handlers 74 that support the community's capabilities or interaction options. The Toolbar and Capabilities Manager 68 interacts with the Capability Handler(s) 74 so that toolbar controls for various capabilities are made available to the user. Preferably, a Capability Handler 74 manages multiple capabilities. A Capability Handler 74 may also arrange to have additional controls (as part of the toolbar or in a separate window/area of the screen) presented to a user to further facilitate a user's interactions with community content and other community members.

Communications between the various components that comprise the Community Client 62, 66, 70, 72, 76, 80 may be accomplished using several mechanisms. For example, well-known interprocess communication mechanisms such as Microsoft's Windows® Dynamic Data Exchange (DDE) 76 or Object Linking and Embedding (OLE) formats may be used. Using DDE, programs running on the same computer (e.g., Web browser and Community Client) may exchange data with each other while they are running. Alternatively, the OLE format may be used such that the information processed by the different applications may be combined or communicated among the applications. Communications between the Community Session Manager 78 and Community Server may be accomplished using a TCP/IP connection 80. It is noted that a lesser or greater number of components may be developed to accomplish the same features and functionality of the Community Client. Furthermore, other arrangements of similar components and other interprocess communication mechanisms may be used to accomplish the same features and functionality of the Community Client.

Figure 3:
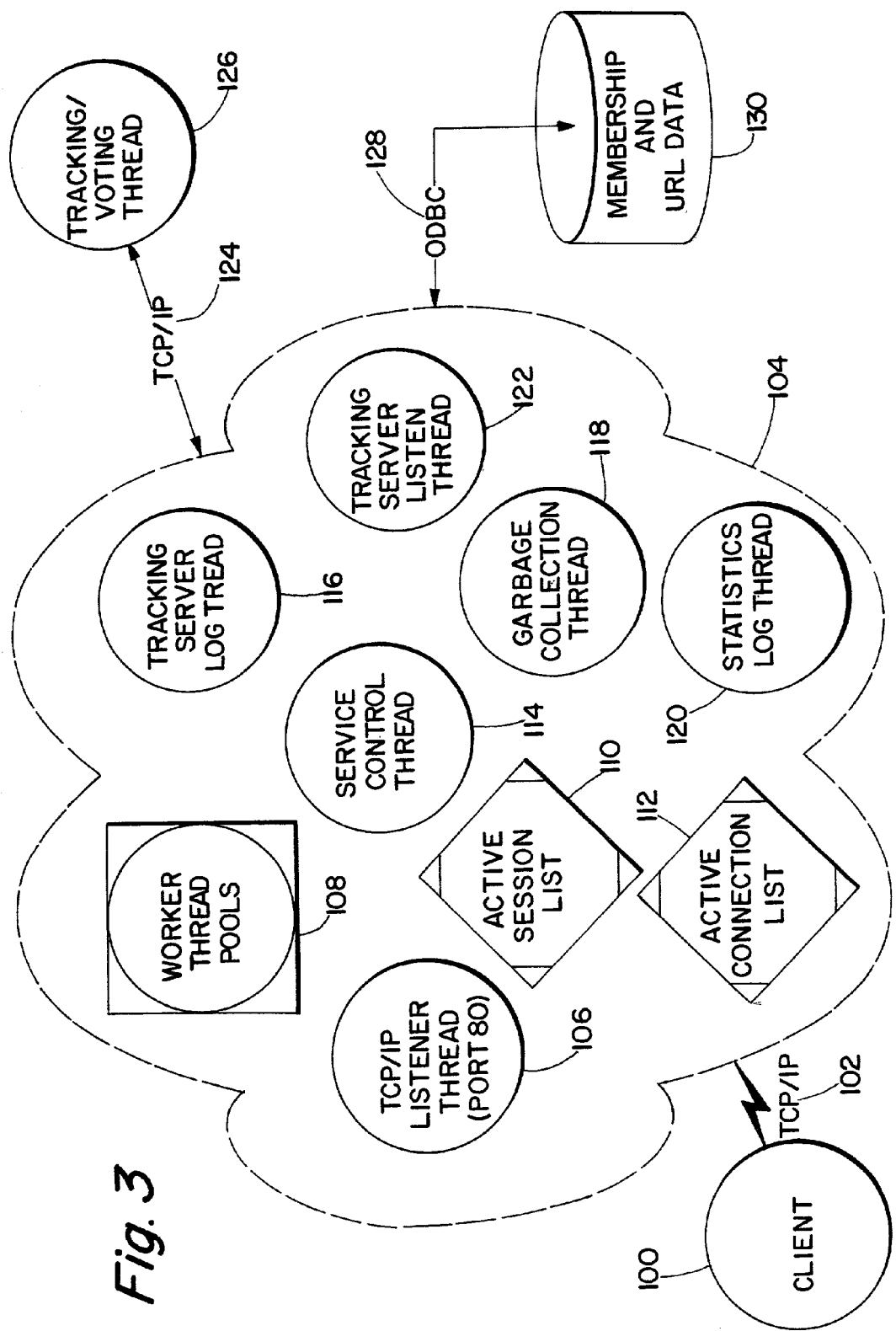
FIG. 3 is a diagrammatic representation of a Community Server architecture for a preferred embodiment of the present invention.

Referring to FIG. 3, a diagrammatic representation of the Community Server 104 architecture for a preferred embodiment of the present invention is shown. The Community Server 104 acts as a dispatcher and gatekeeper to the additional back-end servers that provide the features and functionality of the present invention. It provides a secure entry point for the Community Client 100 and mediates all transactions between the Community Client (and Web browser) and the servers. Preferably, the Community Server 104 relies on asynchronous I/O, (e.g., via HTTP or some other protocol such as FTP or IRC over a TCP/IP connection 102) with the Community Client 100.

In a preferred embodiment, the Community Server 104 may be comprised of several threads. The Service Control Thread 114 performs service initialization, shutdown, and serves as a central repository for global configuration information. The TCP/IP Listener Thread 106 listens on TCP/IP port 80 for inbound client connections. When a client connects to the service, this thread creates a client connection object that is passed to a Connection Worker Thread for processing.

Pseudo code for the main processing loop may be as follows:

While (TRUE)
Block waiting for new client connection
If connection was established OK
Create client connection object
Post a completion event for this connection object to a Connection Worker Thread
Endwhile Three additional classes of worker thread pools 108 may perform the majority of the server's work. The first worker thread pool is the Connection Worker Thread Pool. Typically, there are two of these threads for each processor on the host machine.

Pseudo code for the main processing loop may be as follows:

While (TRUE)
Block waiting for Async I/O Completion Event (via GetQueuedCompletionStatus( ))
Use the data returned by the above to obtain the connection object associated with the I/O event.
Call the connection object's virtual CompletionReceived ( ) method
Endwhile The second worker thread pool is the ODBC Connection Thread Pool. A pool of threads may be created at server startup time, each of which establish a persistent ODBC connection with a community database. Depending on load, the server may also create additional ODBC threads as needed. When a connection object needs to access an ODBC datasource, it may take control of one of these pooled threads and make its database queries in its own dedicated thread.

The third worker thread pool is the Asynchronous I/O Thread Pool. This thread pool is similar to the ODBC Connection Thread Pool in that the threads may be started when the service is initialized. Their main purpose is to allow connection objects to perform synchronous I/O operations (e.g., connecting to the tracking server, performing a synchronous write down a socket, etc.) which may block in a thread so that the main worker threads may continue processing while this blocking I/O occurs.

This Active Session List 110 contains the context of all users currently logged into a particular community server. The user's membership information may be cached here as well as some other maintenance information.

The Active Connection List 112 is a list of all active connections with the Community Server (but not active sessions). This list may be used by the Garbage Collection thread 118 to purge stale connections (e.g., connections waiting for outstanding asynchronous I/O events from a client that may have gone away). A connection is a client establishing a TCP/IP connection with the Community Server, making a request (e.g., login, get URL information, vote, create message, etc.), and receiving a reply. A session is the group of connections that apply to a single user from the initial login request to the logout request. The tracking server may also establish connections that are kept on this list.

This Tracking Server Log 116 thread is dedicated to one-way communication between the Community Server and the Tracking Server. All tracking server transactions that do not require a reply (e.g., those that are used for statistics purposes) are sent to the Tracking Server from a dedicated connection.

The Tracking Server Listener Thread 112 is similar to the TCP/IP Listener Thread 106, except that this listener accepts connections from a Tracking Server (on a different TCP/IP port than client connections come in on). Pseudo code for the main processing loop may be as follows:

While (TRUE)
Block waiting for new tracking server request connection
If connection was established OK
Create tracking server connection object
Post a completion event for this connection object to a Connection Worker Thread
Endwhile The Garbage Collection Thread 118 looks for connections and sessions that have not been active for some configurable period of time. If they have expired, this thread purges them from the service. This function alleviates memory creep as the service runs for long periods of time (perhaps, weeks).

The Statistics Log Thread 120 may track information regarding activity on the server such as how many accesses have been attempted, the length of time users are connected to the Community Server, etc.

A series of transactions between the Community Client and the Community Server take place to accomplish the features and functionality of the present invention. Transactions may be generally in two distinct classes: requests (e.g., Crequest) and responses (e.g., CResponse.) Transactions take place over a persistent virtual connection between the two components. Asynchronous requests may thus be sent between the components, for example, using HTTP, FTP, IRC, etc.

Preferably, the Community Client and Community Server perform all communications across a TCP/IP connection established on port 80. A class (e.g., CSession) is created to handle all client-server protocol negotiation. The client application then handles the contents of predefined CRequest and CResponse classes passed between client and the server.

A client establishes a login session, by sending a login request to the server. Once authenticated (using a RPA enabled Server), the user session may be established and a virtual connection maintained between the client and server. This virtual connection serves as the mechanism by which the server sends asynchronous messages to the client (e.g., via HTTP, FTP, IRC). An example may be a Chat invitation from one user to another community member.

Subsequent requests made by the client of the server may be conducted on a separate connection such as a Windows socket connection. This connection may be established and taken down transparently to the client application (e.g., embedded in the CSession class member functions). This subsequent connection may be authenticated by the server using Remote Passphrase Authentication mechanisms.

Login Transaction

Preferably, there are 4 steps in the login transaction:
Login Request (client to server)
Authentication Challenge (server to client)
Response to Challenge (client to server)
Login Response (server to client)

Preferably, the Client initiates the Login Request by sending the following HTTP request:

"CSI-Community-Session/<version> Login HTTP/1.0<crlf>"

The Community Server responds with an extended HTTP response code of 901 along with a RPA WWW-Authenticate response header. The connection is maintained by both the client and server at this point as the server awaits the clients response to the RPA challenge.

The client sends a Login Packet of the following format:

| Field Name | # ytes | DESCRIPTION |
| --- | --- | --- |
| Version ID | 4 | Version identifier of the packet |
| Packet Length | 4 | Length of Login Packet in bytes |

-continued

| Field Name | # ytes | DESCRIPTION |
|---|---|---|
| Login Packet | varies | Serialized MFC Cobject derived class containing:<br>DWORD    Request Type Code<br>DWORD    Transaction Version Id<br>CString    RPA Authorization<br>Cheating Header |

Login Response (Server to Client)

If authenticated, the server responds with a Login Response packet.

| Field Name | # Bytes | DESCRIPTION |
|---|---|---|
| Version ID | 4 | Version identifier of the packet |
| Packet Length | 4 | Length of Login Packet in bytes |
| Login Response Packet | varies | Serialized MFC Cobject derived class containing:<br>DWORD    Response type Code<br>DWORD    Version ID<br>CString    RPA security context<br>CString    RPA session key<br>CString    RPA response<br>CString    User Name<br>CString    User Name Realm<br>DWORD    Base Community ID<br>CobArray   Array of N member info objects<br>Member Info Object structure<br>DWORD    Community ID<br>CString    CommunityName<br>CString    Community Homepage URL<br>Cstring    User Alias (screen name)<br>DWORD    Flags |

There are 2 steps in the client request protocol:
1. Request (client to server)
2. Response (server to client)

The client initiates the Login Request by sending the following HTTP request.

CSI-Community-Session/<version> Request HTTP/1.0 <crlf>
Content-Length: <length of request packet> <crlf>
<crlf>
<request transaction>

The format of a request transaction may be as follows:

| Field Name | # Bytes | DESCRIPTION |
|---|---|---|
| Version ID | 4 | Version identifier of the packet |
| Packet Length | 4 | Length of Request Packet in hytes |
| Request Packet | varies | Serialized MFC Cobject derived class containing:<br>DWORD    Request Type Code<br>DWORD    Transaction Version Id<br>CString    RPA Authorization<br>        Cheating Header<br><varies depending on packet type> |

The following table contains of the various request types.

| Request Type | Code | Direction<br>C - Client<br>S - Server | Contents | |
|---|---|---|---|---|
| Error | 0 | C ⇒ S | DWORD | Error Code.Win32 or WINSOCK error code |
| | | | CString | Descriptive error message |
| Login | 1 | C ⇒ S | N/A | See Login protocol |
| Logout | 2 | S ⇒ C | N/A | Client informs server that user is logging off. |
| Get URL Info | 3 | C ⇒ S | CString | URL |
| | | | CDWordArray | Array of community IDs the client is querying the server about for this URL |
| Invite | 4 | C ⇒ S<br>- or -<br>S ⇒ C | CString | User Name of member initiating the invitation |
| | | | CString | Invitation type |
| | | | DWORD | IP Address of server handling the invitation (a chat server, for example). Unused when sent from client to server. |
| | | | DWORD | Port of server handling the invitation, Unused when sent from client to server. |
| | | | CString | Channel Unused when sent from client to server. |
| | | | DWORD | Context. Opaque item to be sent back to Community server in the client response to this request. |
| Invite Reply | 5 | C ⇒ S | CString | User Name of member initiating the invitation |
| | | | CString | Invitation type |
| | | | DWORD | Context. Opaque item obtained from the invitation request received from the server. |
| Create New Message | 6 | C ⇒ S | CString | URL to associate with new threaded message. |
| | | | DWORD | Community ID to associate with threaded message. |
| Membership Search | 7 | C ⇒ S | DWORD | Unused. If the server receives this requests, it performs a "Who is Here" search. (i.e., it returns a list of all users currently logged into the community.) |
| Vote | 8 | C ⇒ S | CString | URL being voted for. |
| Timeout | 9 | S ⇒ C | | Server is informing the client that the session has timed out. |

On success, the server may respond with an
HTTP/1.0 200 OK <crlf>
<optional HTTP response headers>
<crlf>
<response transaction>
-or-
HTTP/1.0 401 Unauthorized <crlf>
<optional HTTP response headers>
<crlf>
-or-
HTTP/1.0<http response code> <http reason> <crlf>

<optional HTTP response headers>
<crlf>

In 401 Unauthorized case, the user's login session context times out and the client performs the login sequence again. This reauthentication may be done transparently to the user.

If a non-401 or 200 HTTP status code is encountered, some error occurred on the server side. The standard HTTP response code gives an indication of what the problem is.

The format of a success response transaction may be as follows:

| Field Name | # Bytes | DESCRIPTION |
| --- | --- | --- |
| Version ID | 4 | Version identifier of the packet |
| Packet Length | 4 | Length of Packet in bytes |
| Response Packet | varies | Serialized MFC Cobject derived class containing:<br>DWORD Response type Code<br>DWORD Version ID<br><Varies depending on response type> |

The following table describes the various response types. All are sent from server to client.

| Response Type | Code | Contents | |
| --- | --- | --- | --- |
| Error | 0 | DWORD | Error Code. Win32 or WINSOCK error code |
| | | CString | Descriptive error message. |
| OK | 1 | N/A | Generic "success" response |
| Login | 2 | N/A | See login protocol. |
| Get URL Info | 3 | CString | URL |
| | | CObArray | Array (0 or more) of the following: |
| | | DWORD | Community ID |
| | | CString | URL to get to threaded message for this URL |
| | | DWORD | Flags |
| Invite | 4 | CString | User Name of member invited |
| | | CString | Invitation type |
| | | BOOL | If non-zero, the user accepted the invitation. |
| | | DWORD | IP Address of server handling the invitation (a chat server, for example). |
| | | DWORD | Port of server handling the invitation |
| | | CString | Channel (may be blank) |
| Create New Message | 5 | CString | URL to follow to create new threaded message. |
| Membership Search | 6 | CStringArray | Array of user names of all users matching search criteria. |

There are 2 steps in the Server Request Transaction:
1. Request (client to server)
2. Response (server to client)

The server makes asynchronous requests of the client. The request type sent by the server to the client is an invitation request.

| Field Name | # Bytes | DESCRIPTION |
| --- | --- | --- |
| Version ID | 4 | Version identifier of the packet |
| Packet Length | 4 | Length of Request Packet in bytes |

-continued

| Field Name | # Bytes | DESCRIPTION |
| --- | --- | --- |
| Request Packet | varies | Serialized MFC CObject derived class containing:<br>DWORD Request Type Code<br>DWORD Transaction Version ID<br>CString User Name of member initiating the invitation<br>CString Invitation type<br>DWORD IP Address of server handling the invitation (a chat, server for example).<br>DWORD Port of server handling the invitation<br>CString Channel (may be blank)<br>DWORD Context. Opaque item to be sent back to the Community server in the client response to this request. |

Figure 4:
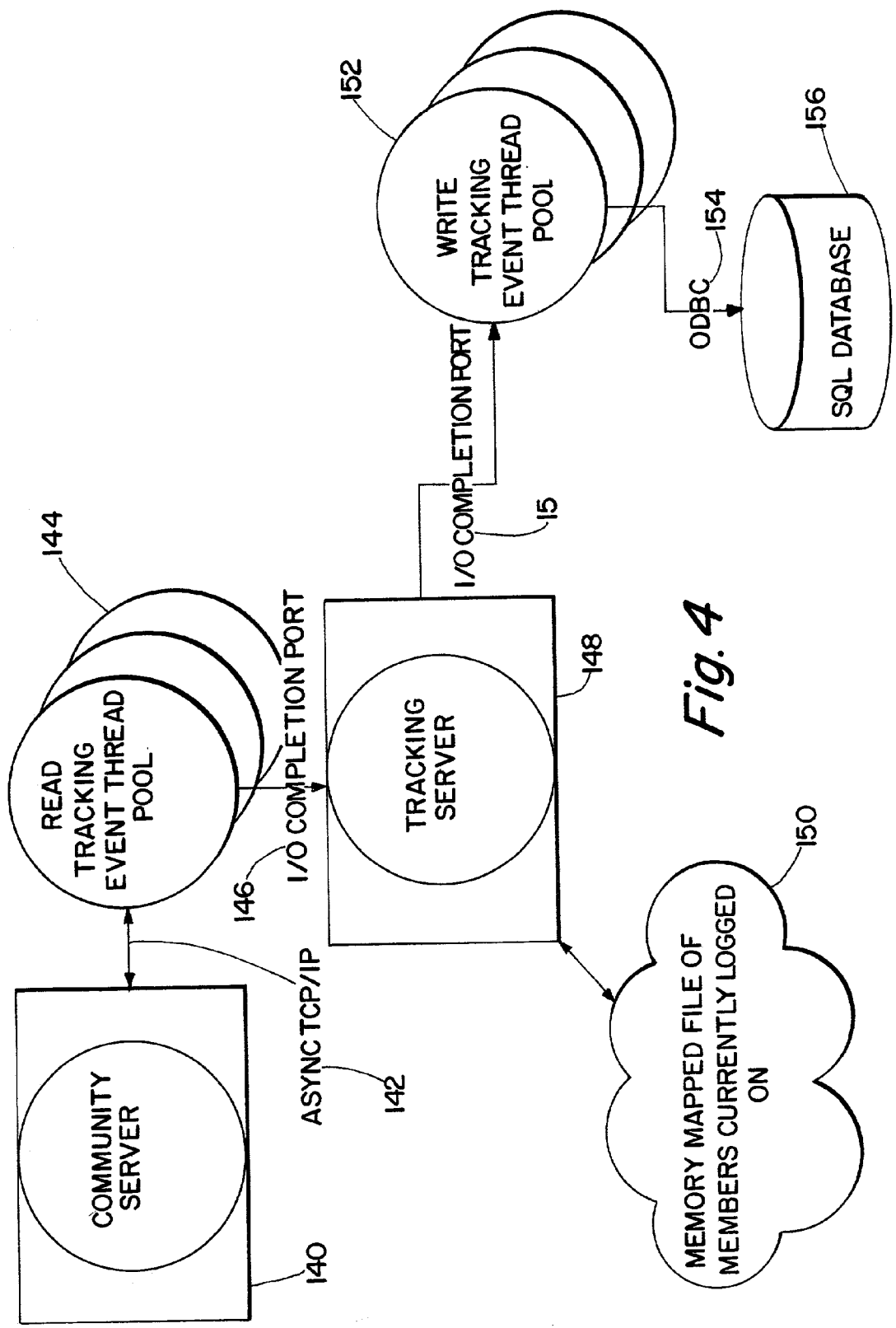
FIG. 4 is a diagrammatic representation of a Tracking Server architecture for a preferred embodiment of the present invention.

Referring to FIG. 4, a diagrammatic representation of a Tracking Server 148 architecture for a preferred embodiment of the present invention is shown. The Tracking Server 148 logs the activities of users served by the Community Server. As users change URLs, post community messages, join and leave chat sessions, etc., these actions are reported by the Community Clients running on their computers to the Community Server 140. This information may then be reported by the Community Server 140 to the Tracking Server 148 via a TCP/IP connection 142 to a Read Tracking Event Thread pool 144. The Tracking Server 148 then receives the information from the threads in the pool via an I/O Completion Port 146. The Tracking Server 148 modifies the information (e.g., by stripping a user identifier that may be associated with the action) and records it in a SQL Tracking Database 156 via an I/O Completion Port 158 connection to a Write Tracking Event Thread pool 152. The Tracking Server also maintains a list of current users in a Memory Mapped File 150 that may be interrogated by the Community Server 140 on behalf of a client. Tracking may be used in the following examples:

Voting
Tracking
On-Line Activity
Establishing connectivity between Community Members (e.g., Gaming & Real-time Conferencing (Chat)).
Determining "Who is Here ?"

All transactions sent to the Community Server 140 may be filtered in one way or another through the Tracking Server(s) 148.

Communications between the Community Server 140 and the Tracking Server 148 are based on a request/response protocol layered on TCP/IP 142. Requests and responses are serialized objects of a type derived from a object (e.g., identified as CTrackTransaction.)

The Community Server 140 opens an asynchronous TCP/IP connection 142 to the Tracking Server 148 upon startup. If the connection is lost or the Tracking Server 148 is not running, the Community Server 140 may attempt to reestablish a connection periodically.

In the event of an invitation request, a separate asynchronous TCP/IP connection may be made to the Community Server where the user is logged in that receives the invitation. After either accepting or declining the invitation, the Tracking Server uses the existing connection to the original Community Server to let the inviter know what happened.

As shown in FIG. 4, the Tracking Server 148 may be implemented as a multi-threaded server 144 listening for asynchronous connections on a specified port (i.e., I/O Completion Port) 146. Two thread pools exist to work on incoming data: a connection pool and an ODBC pool.

The Connection Worker threads dispatch incoming data to the appropriate ODBC thread. Each ODBC worker thread, upon initialization, opens an ODBC connection to a SQL server.

The Community Server and Tracking Server may communicate via the following transactions.

| Transaction Type (Class Name) | Description | Direction (CS - Community Server) (TS - Tracking Server) |
| --- | --- | --- |
| CsetupTrack | Server to server communication | CS ⇒ TS |
| CloginTrack | User logged into Community | CS ⇒ TS |
| ClogoutTrack | User left Community, either by logout or time-out | CS ⇒ TS |
| CcreateMsgThreadTrack | User created a message section | CS ⇒ TS |
| CGetAnnotationTrack | User obtained an annotation | CS ⇒ TS |
| CWhoIsHereTrackReq | User requests a list of other logged in members | CS ⇒ TS |
| CWhoIsHereTrackRsp | List of logged in members | TS ⇒ CS |
| CURLInfoTrack | User went to a new page | CS ⇒ TS |
| CinviteTrackReq | User extends an invitation to chat to another user | CS ⇒ TS |
| CinviteTrackRsp | Invited user accepts or declines chat invitation | TS ⇒ CS |
| CinviteTrackReq (special context) | Tracking server interrogates community server | TS ⇒ CS |
| CinviteTrackRsp (special context) | Community server returns invited user's response | CS ⇒ TS |
| CvoteURLTrack | User voted | CS ⇒ TS |

Preferably, transactions carry the following data (type): user Id (string), community Id (number), server Id (number), transaction type, also called request code (number), and version (number). Because transactions are serialized objects, the transaction may include the name of the type of the transaction and a schema version number. The bytes of the serialized object are preceded by 8 bytes: 4 (representing a 32 bit number, in network byte order) that identify the version of the packet, and 4 (also representing a 32 bit number, in network byte order) that specify the number of bytes that follow.

Transactions may convey additional data appropriate to the type of transaction. The additional data may be appended to the transaction in the order specified in the table. Note that strings (e.g., designated CString) may be a single byte count of characters followed by exactly that many characters with no null terminating byte. Numbers are LSB first. Boolean type is a 32 bit number with a value of either 0 or 1.

| Transaction Type | Transaction Specific Data |
| --- | --- |
| CSetupTrack | persistence flag (Boolean) |
| CLoginTrack | URL (Cstring) |
| CLogoutTrack | none |
| CCreateMsgThreadTrack | URL (Cstring) |
| CGetAnnotationTrack | URL (Cstring) |
| CWhoIsHereTrackReq | none |
| CWhoIsHereTrackRsp | list of user Ids (number) (CString) (CString) (CString) . . . |
| CURLInfoTrack | URL (Cstring) |
| CInviteTrackReq | user Id of invitee (CString), type of interaction: chat, game, etc. (CString), IP address of server hosting inviting user (number) and port of server hosting inviting user (number) |
| CInviteTrackRsp | acceptance flag (Boolean), reason code (number), IP address of server hosting invitee (number) and port of server hosting invitee (number) |
| CVoteURLTrack | name of item or URL (CString), score (number) |

For example, the CWhoIsHereTrackReq transaction may trigger a CWhoIsHereTrackRsp reply, and a CInviteTrackReq transaction may trigger a CInviteTrackRsp reply. Preferably, the reply packets are returned via the same connection that delivers tracking transactions to the Tracking or Voting Servers.

Invitation processing is special compared to the other transactions. For example, the CInviteTrackReq transaction causes the Tracking Server to open a connection to a second Community Server (which may be the same Community Server that initiated the invitation) and emit a CInviteTrackReq transaction, to inquire of the Community Server whether a particular user (the invitee) is still logged in. When the Community Server returns a yes or no CInviteTrackRsp transaction, the Tracking Server disconnects, and returns a CInviteTrackRsp transaction to the originally requesting Community Server.

The CSetupTrack transaction is sent by the Community Server to the Tracking Server when the Community Server connects to the Tracking Server. The persistence flag indicates whether the Community Server expects the connection to remain open for more than one transaction. This scheme permits the Community Server to occasionally connect to the Tracking Server for a single query.

Every transaction may be recorded in the tracking table of the tracking database using the base information (e.g., user id, community id, server id, and request code), and the corresponding URL, if available. For example, CLoginTrack and CLogoutTrack transactions may cause the addition or removal of user id information from a "Who is Here" list which is kept in memory. Finally, the CInviteTrackReq transaction queries the "Who is Here" list while the CWhoIsHereTrackReq transaction returns the entire list.

In a preferred embodiment in which voting is supported, the CVoteURLTrack transaction may cause the community id, the item string, and the score to be inserted into or updated in the vote table and the vote count to be incremented. The value of the score is added to the score (initially zero) for the particular community id and issue combination.

| Transaction Type | Description | Destination |
| --- | --- | --- |
| CSetupTrack | Server to server communication | none |
| CLoginTrack | User logged into Community | tracking |
| CLogoutTrack | User left Community, either by logout or time-out | tracking |
| CCreateMsgThreadTrack | User created a message section | tracking |

-continued

| Transaction Type | Description | Destination |
| --- | --- | --- |
| CGetAnnotationTrack | User obtained an annotation | tracking |
| CWhoIsHereTrackReq | User requests a list of other logged members | tracking, fetches "Who Is Here" list |
| CWhoIsHereTrackRsp | List of logged in members | returns "Who Is Here" list |
| CURLInfoTrack | User went to a new page | tracking |
| CInviteTrackReq | User extends to another user an invitation to chat | tracking, queries "Who Is Here" list |
| CInviteTrackRsp | Invited user accepts or declines chat invitation | returns found or not found |
| CVoteURLTrack | User voted | tracking, vote |

Datasource Connectivity

Preferably, the Tracking Server connects to a SQL server via the ODBC application programming interface. The datasource that the Tracking Server connects to may be determined at startup. Multiple ODBC (over TCP/IP or NetBeui protocols) connections are made to a SQL server (one per ODBC worker thread) upon initialization and maintained throughout the life of each thread. All tracking transactions execute prepared ODBC-SQL statements to log the transaction.

Figure 5:
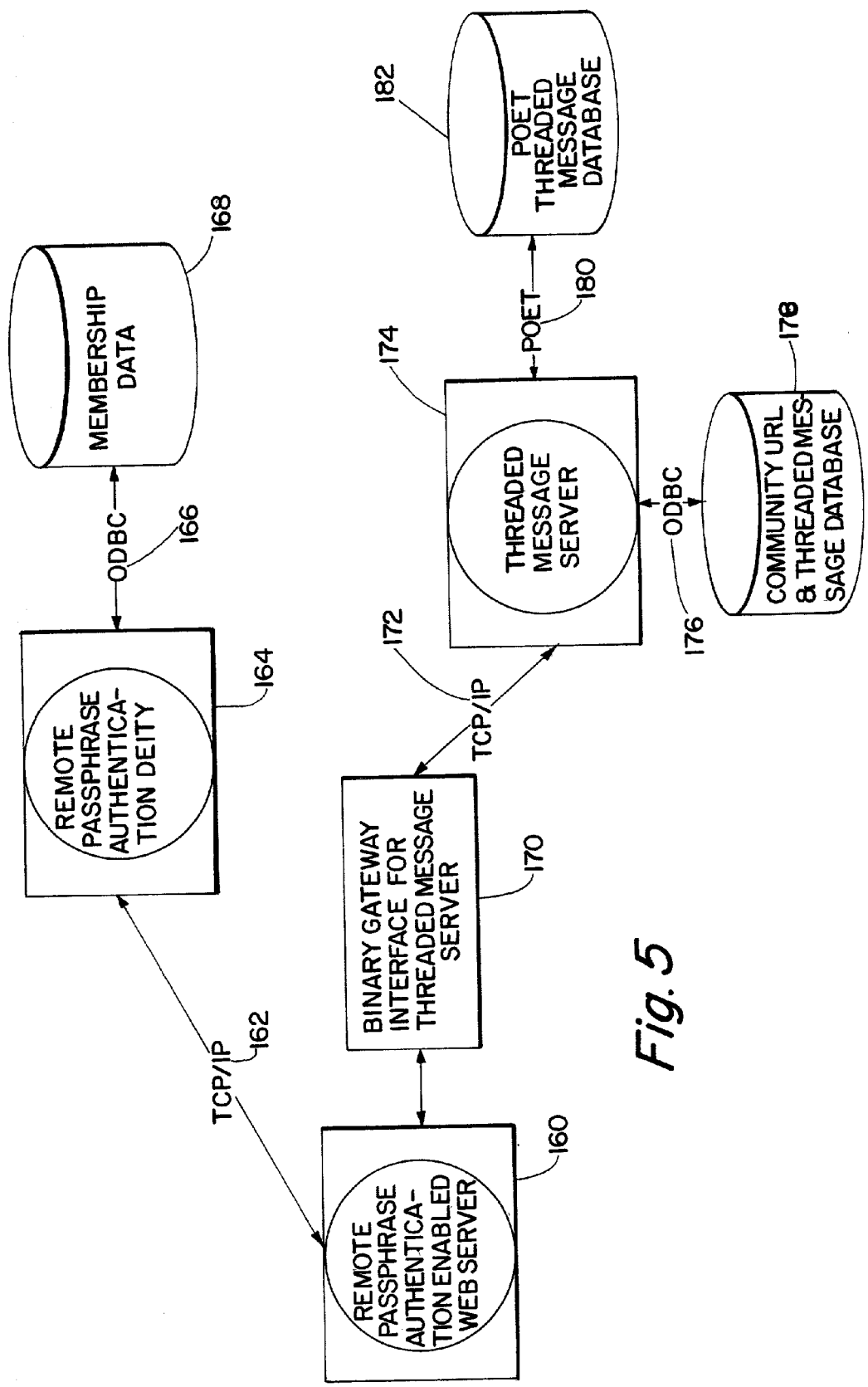
FIG. 5 is a diagrammatic representation of a Threaded Message Server architecture for a preferred embodiment of the present invention.

Referring to FIG. 5, a diagrammatic representation of the Threaded Message Server 174 is shown. The Threaded Message Server 174 is used to create and retrieve member threaded message annotations created on specific URL's (i.e., Web pages.) The threaded message annotations may be stored in a Threaded Message Database 182 accessible via a POET interface 180. In a preferred embodiment, the Threaded Message Server 174 runs as an extension to a Remote Passphrase Authentication (RPA) enabled Server 160 (with a TCP/IP connection to a Remote Passphrase Authentication Deity 164 that performs authentication via an OBDC connection 166 to a membership database 168) to ensure that is accessed through a secure means. Preferably, the Threaded Message Server 174 is not required on a per community basis, but rather acts as a global resource and is shared between communities.

Preferably, the Threaded Message Server 174 receives notifications from the RPA enabled Server 160 via the Community Client rather than the Community Server. A Binary Gateway Interface 170 facilitates communication between the RPA enabled Server 160 and Threaded Message Server 174. For example, a Threaded Message Server Dynamic Link Library (TMS.DLL) may run as an extension to a RPA enabled Server. The RPA enabled Server may communicate with TMS.DLL through a combination of the HTTP GET and POST methods, depending on the nature of the requested transaction. TMS.DLL may then interact with the Threaded Message Server 174 through remote procedure calls (RPC) and the Community URL Database Server 178 through ODBC calls 176. Results of each transaction may be returned to the Web Server as dynamically created HTML pages.

GET Method

The following transactions may be requested through the use of the HTTP GET method:
 PrintSectionThreads
 PrintThreadMessages
 PrintMessage
 GenerateReplyPage
 GenerateCreateMessagePage PrintSectionThreads This transaction prints a HTML page containing a list of threads in a given message base section. Each thread item printed is a hyper-link to the PrintThreadMessages transaction. Appropriate navigational controls are also be displayed. One of these controls may be a link to the GenerateCreateMessagePage transaction.

PrintThreadMessages

This transaction prints a HTML page containing a list of the messages in a given thread. Each message item printed is a hyper-link to the PrintMessage transaction. Appropriate navigational controls are also displayed.

PrintMessage

This transaction prints a HTML page displaying the contents of a message. Navigational controls are also displayed. One of these controls is a link to the GenerateReplyPage transaction.

GenerateReplyPage

This transaction prints a HTML page containing the form controls needed to create a reply to a message. The page also contains hidden controls needed to store state information that will be passed to the PostReply transaction via the POST command.

GenerateCreateMessagePage

This transaction prints a HTML page containing the form controls needed to create a message. The page also contains the hidden controls needed to store state information that may be passed to the PostCreateMessage transaction via the POST command.

POST Method

The following transactions are requested through the use of the HTTP POST method:
 PostCreateMessage
 PostReply PostCreateMessage This transaction uses the contents of the HTML form controls created by the GenerateCreateMessagePage transaction to create a new message. The data is sent via the HTTP POST method.

PostReply

This transaction uses the contents of the form controls created by the GenerateReplyPage transaction to create a reply to a message. The data is sent via the POST method.

Figure 6:
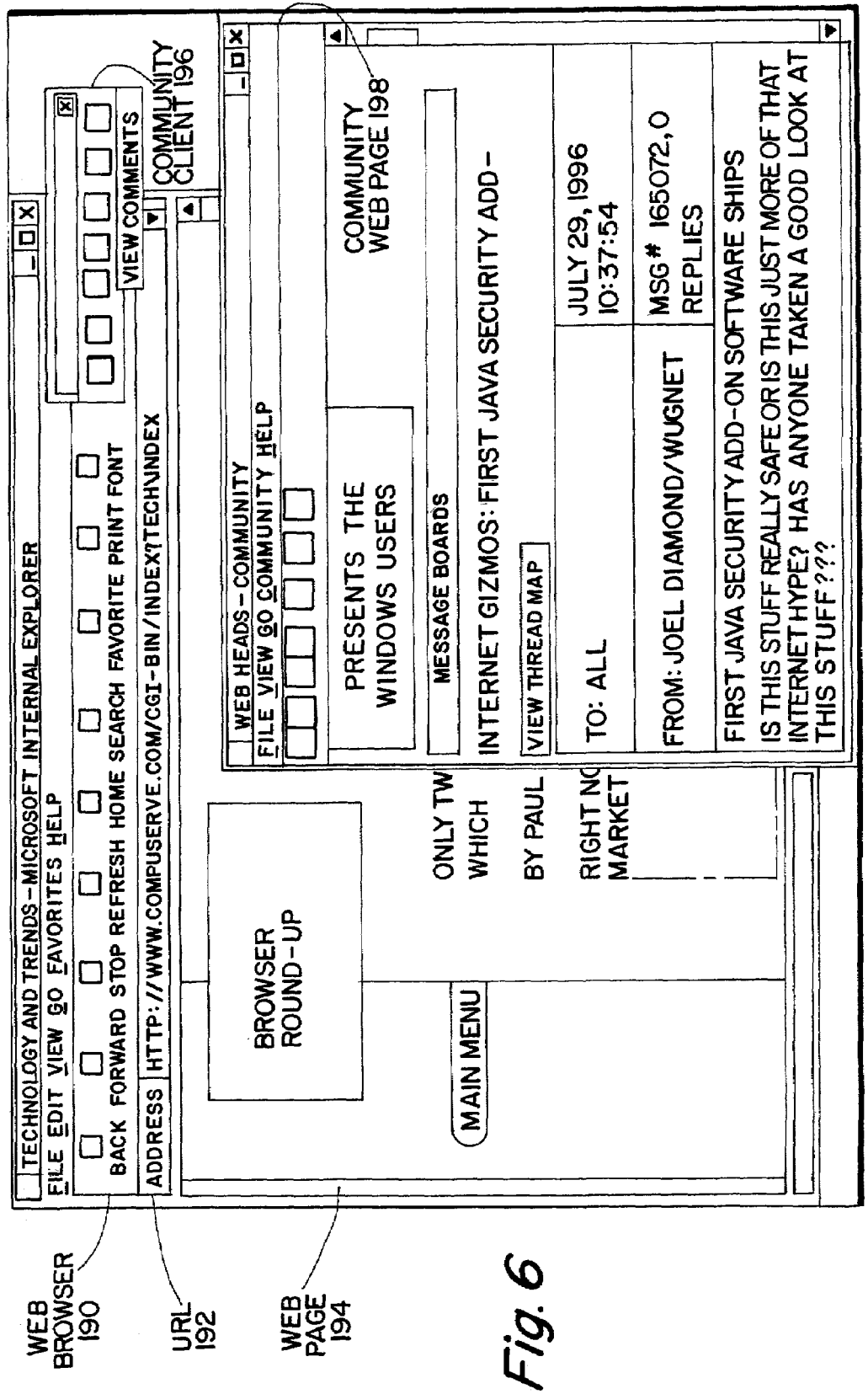
FIG. 6 is a screen shot of Web page, Community Client, and Community Web page for a preferred embodiment of the present invention.

Referring to FIG. 6, a screen shot of Web page 194, Community Client 196, and Community Web page 198 for a preferred embodiment of the present invention is shown. The Web page 194 associated with the URL 194 is displayed by the Web browser 190 (in this example, Microsoft's Internet Explorer) running on the user's computer. The Community Client 196 runs independently of the Web browser 190 and appears as a toolbar on the display. The toolbar of the Community Client comprises a plurality of custom control buttons. The control buttons are similar to menu commands (i.e., allow the user to perform actions), but are less obtrusive than menus and are always accessible. Each control button may provide a different type of community function. For example, one control button may allow a user to access threaded messages associated with the current URL. The messages may appear on a separate page (or window) 198 with additional control options for navigating the messages. For example, one or more control buttons on the message page may be used to move forward and backward in the message thread.

In another example, a "Community Home Page" button control on the Community Client toolbar may be available to transport the user directly to the home page of the community Web site. The home page may serve as a place where users may go to be in an environment specially designed for their interests. Another control button on the toolbar may invoke a start/stop mechanism to enable users to start and stop the Community Client when it resides with another application such as a Web browser. Another control button may allow users to join or disassociate themselves with particular communities. Selection of certain control buttons may cause a supplemental client application (i.e., an application with an independent interface) to be invoked to facilitate certain interactions. For example, selection of a particular control button may initiate a chat session with other community members. The chat session may be initiated and managed through a separate (i.e., independent of the user's browser or Community Client) application that is invoked when the control button is selected and is stopped when the user decides to leave the session.

In a preferred embodiment of the present invention, the toolbar is extensible and dynamic so that a user may modify or tailor it to meet his or her needs or preferences. Users may extend the capabilities of the toolbar by creating new capabilities based on the primary or core capabilities provided by the present invention. As described earlier, the primary or core set of capabilities may include a Community Centre, Create or View comments, Who's Online, Chat, or Invitations. Other communities may have special capabilities in addition to the core capabilities. Using a scripting language, a user may extend the toolbar by creating a new option comprised of primary or core capabilities. For example, a user may create a "Game" capability comprised of the "Who's Online" capability and "Invitation" capability. When invoked from the toolbar, the Game capability may provide the user with a list of community users currently on-line and then invoke a game based on a another community member's acceptance of an invitation to play a game.

Display of community information is preferably controlled by a community viewer that provides a basic window frame in which community content displayed as well as support for additional administrative functions and capabilities. The community viewer arranges to display Community information in a single window or multiple windows depending on the amount and type of information displayed. Preferably, the information is represented by HTML pages identified by a URL. For example, annotations for a specific Web page, the list of members who are currently present in a community, and an annotation creation page may all be presented as different HTML pages associated with different URLs. In addition, capabilities such as accessing the community home page, viewing community comments, and joining communities may be supported by HTML pages and associated applications as identified by a URL.

The present invention provides a new system and method for integrating Web/Internet and on-line service content and interactions to create a community. The present invention operates as an extension to a user's preferred Web browser so the user is not required to learn a new user interface to locate on-line service content or interact with other community members. On-line service content is delivered to the user in response to the URLs specified by the user as he or she browses the Web. In addition, opportunities for interacting with other community members are presented to the user. The user may change URLs and Web sites frequently while the present invention maintains a context—via a persistent connection between a Community Server and a Community Client—for the user's interactions so that on-line service content may be presented and interactions facilitated. The benefit of the present invention for end-users is a transformation of the Web to a much friendlier and valued place—a community.

What is claimed is:

1. A method performed by a client computer system executing a browser, the method comprising:
   sending a request for a web page;
   receiving the web page from a first server;
   displaying the web page using the browser;
   sending an identification of the web page to a second server;
   receiving content from the second server, wherein the content is selected by the second server based on the identification sent to the second server;
   displaying a toolbar, wherein the toolbar comprises at least one button; and
   displaying the received content in response to a user selecting the button.

2. The method of claim 1 wherein displaying the received content comprises displaying the received content while the web page is displayed using the browser.

3. The method of claim 1 wherein:
   displaying the web page using the browser comprises displaying the web page in a pane of the browser; and
   displaying the received content comprises displaying the received content in a pane separate from the browser pane.

4. The method of claim 1 wherein the identification is sent separately from the request for the web page sent to the first server.

5. The method of claim 1 wherein the toolbar comprises a second button, the method further comprising initiating a chat session in response to a user selecting the second button.

6. The method of claim 1 wherein the toolbar comprises a second button, the method further comprising adding the identification of the web page to a set of bookmarks shared by multiple online users in response to a user selecting the second button.

7. The method of claim 1 wherein the toolbar comprises a second button, the method further comprising initiating an online game session in response to a user selecting the second button.

8. The method of claim 1 wherein the received content comprises annotations associated with the web page.

9. The method of claim 8 wherein the annotations are threaded messages provided by multiple users.

10. The method of claim 1 wherein the received content comprises identifications of other online users currently viewing the web page.

11. The method of claim 1 wherein the received content is related to the web page by subject matter.

12. A client computer system comprising:
   a browser to send a request for a web page to a first server;
   an application in communication with the browser to:
      send an identification of the web page to a second server,
      receive content from the second server, wherein the content is selected by the second server based on the identification sent to the second server,
      display a toolbar, wherein the toolbar comprises at least one button; and
      display the received content in response to a user selecting the button.

13. The client computer system of claim 12 wherein the application displays the received content while the web page is displayed using the browser.

14. The client computer system of claim 12 wherein:
the browser displays the web page in a pane of the browser; and
the application displays the received content in a pane separate from the browser pane.

15. The client computer system of claim 12 wherein the identification is sent separately from the request for the web page sent to the first server by the browser.

16. The client computer system of claim 12 wherein the toolbar comprises a second button, and the application initiates a chat session in response to a user selecting the second button.

17. The client computer system of claim 12 wherein the toolbar comprises a second button, and the application adds the identification of the web page to a set of bookmarks shared by multiple online users in response to a user selecting the second button.

18. The client computer system of claim 12 wherein the toolbar comprises a second button, and the application initiates an online game session in response to a user selecting the second button.

19. The client computer system of claim 12 wherein the received content comprises annotations associated with the web page.

20. The client computer system of claim 19 wherein the annotations are threaded messages provided by multiple users.

21. The client computer system of claim 12 wherein the received content comprises identifications of other online users currently viewing the web page.

22. The client computer system of claim 12 wherein the received content is related to the web page by subject matter.

23. A computer usable medium containing a computer program, the computer programming comprising instructions for causing a client computer system executing a browser to perform the following operations:
send an identification of a web page to a first server, wherein the identification is sent separately from a request for the web page sent to a second server by the browser;
receive content from the first server, wherein the content is selected by the first server based on the identification sent to the first server;
display a toolbar, where the toolbar comprises at least one button; and
display the received content in response to a user selecting the button.

24. The medium of claim 23 wherein, to display the received content, the computer program further comprises instructions for causing the client computer system to display the received content while the web page is displayed using the browser.

25. The medium of claim 23 wherein, to display the received content, the computer program further comprises instructions for causing the client computer system to display the received content in a pane separate from a pane of the browser.

26. The medium of claim 23 wherein the toolbar comprises a second button, the computer program further comprising instructions for causing the client computer system to initiate a chat session in response to a user selecting the second button.

27. The medium of claim 23 wherein the toolbar comprises a second button, the computer program further comprising instructions for causing the client computer system to add the identification of the web page to a set of bookmarks shared by multiple online users in response to a user selecting the second button.

28. The medium of claim 23 wherein the toolbar comprises a second button, the computer program further comprises instructions for causing the client computer system to initiate an online game session in response to a user selecting the second button.

29. The medium of claim 23 wherein the received content comprises annotations associated with the web page.

30. The medium of claim 29 wherein the annotations are threaded messages provided by multiple users.

31. The medium of claim 23 wherein the received content comprises identifications of other online users currently viewing the web page.

32. The medium of claim 23 wherein the received content is related to the web page by subject matter.

33. An apparatus comprising:
means for sending a request for a web page;
means for receiving the web page from a first server;
means for displaying the web page using a browser;
means for sending an identification of the web page to a second server;
means for receiving content from the second server, wherein the content is selected by the second server based on the identification sent to the second server;
means for displaying a toolbar, wherein the toolbar comprises at least one button; and
means for displaying the received content in response to a user selecting the button.

34. The apparatus of claim 33 wherein the means for displaying the received content comprises means for displaying the received content while the web page is displayed using the browser.

35. The apparatus of claim 33 wherein:
the means for displaying the web page using the browser comprises means for displaying the web page in a pane of the browser; and
the means for displaying the received content comprises means for displaying the received content in a pane separate from the browser pane.

36. The apparatus of claim 33 wherein the identification is sent separately from the request for the web page sent to the first server.

37. The apparatus of claim 33 wherein the toolbar comprises a second button, the apparatus further comprising means for initiating a chat session in response to a user selecting the second button.

38. The apparatus of claim 33 wherein the toolbar comprises a second button, the apparatus further comprising means for adding the identification of the web page to a set of bookmarks shared by multiple online users in response to a user selecting the second button.

39. The apparatus of claim 33 wherein the toolbar comprises a second button, the apparatus further comprising means for initiating an online game session in response to a user selecting the second button.

40. The apparatus of claim 33 wherein the received content comprises annotations associated with the web page.

41. The apparatus of claim 40 wherein the annotations are threaded messages provided by multiple users.

42. The apparatus of claim 33 wherein the received content comprises identifications of other online users currently viewing the web page.

43. The apparatus of claim 33 wherein the received content is related to the web page by subject matter.

* * * * *